UNITED STATES PATENT OFFICE.

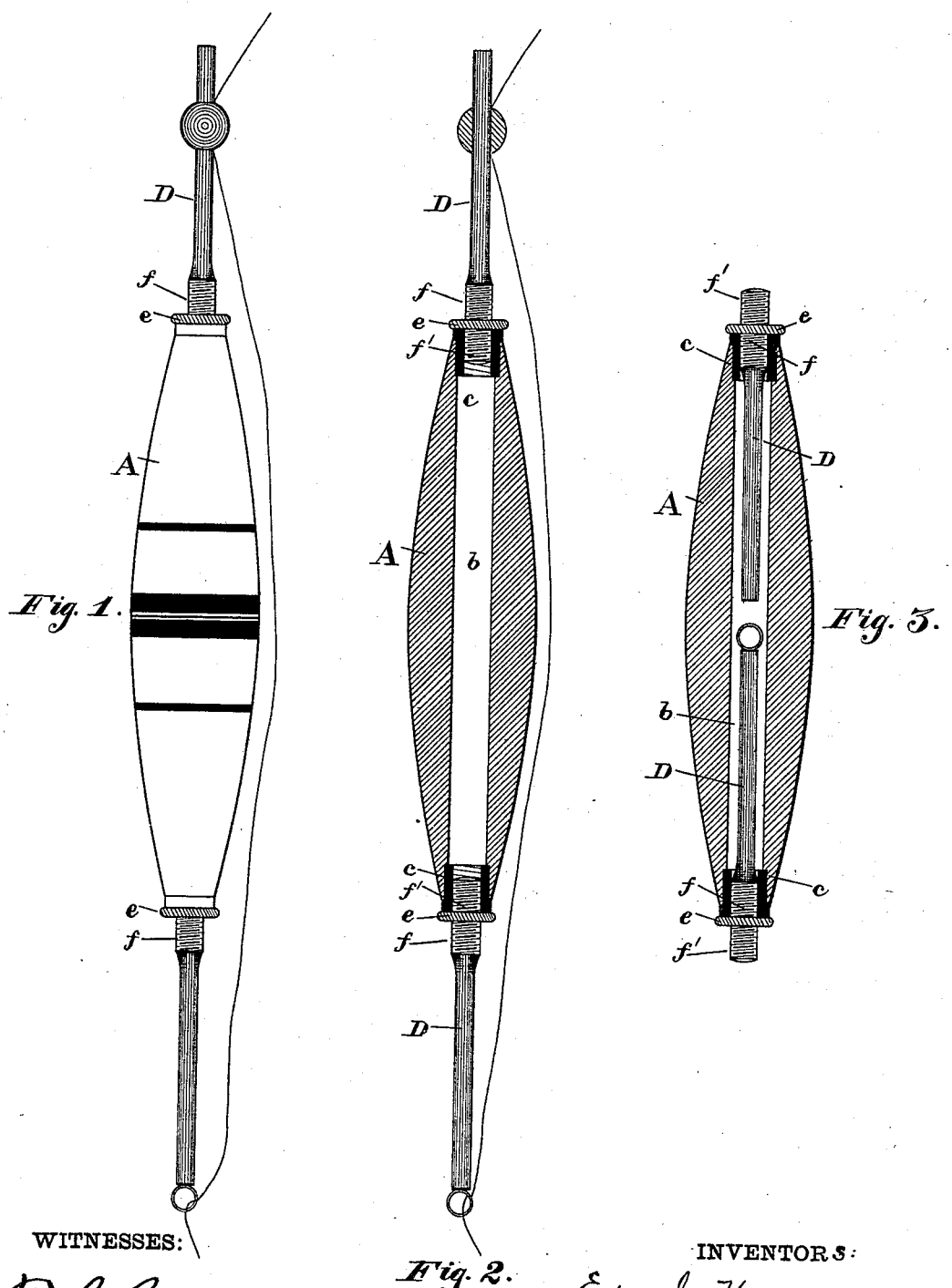

EDWARD J. HAYES AND JOHN T. OCHS, OF BALTIMORE, MARYLAND.

FLOAT FOR FISHING-LINES.

SPECIFICATION forming part of Letters Patent No. 395,900, dated January 8, 1889.

Application filed June 23, 1888. Serial No. 278,045. (No model.)

*To all whom it may concern:*

Be it known that we, EDWARD J. HAYES and JOHN T. OCHS, citizens of the United States, residing at Baltimore, in the State of Maryland, have invented certain new and useful Improvements in Floats for Fishing-Lines, of which the following is a specification.

Our invention relates to an improved float for fishing-lines, which is illustrated in the accompanying drawings, in which—

Figure 1 is a side view of the float and line, the stems being in normal position. Fig. 2 is a vertical section of the float, showing the parts in the same position they have in Fig. 1. Fig. 3 is a vertical section in which the stems are shown reversed, as when not in use, and are protected by the body of the float.

The letter A designates the float-body, made of light wood or cork, and having a central cavity, $b$. At each end the body leading to the cavity is a female screw, $c$, and a stem, D, is detachably secured to each of said ends. The normal position of the stems when the float is in use on a bait-line is shown in Figs. 1 and 2. These stems are slender and fragile and liable to be broken when not in use, and to protect them they are made so as to be readily detached, reversed, and inserted into the cavity of the float-body, as shown in Fig. 3.

Our invention is not limited to the screw as the means of attaching the stems.

The stems have a collar, $e$, and a male screw, $f f'$, each side of said collar. It will be seen that the one screw, $f$, serves to attach the stem to the float in its normal position, and the other screw, $f'$, serves to attach it when it is inserted into the cavity $b$ of the float, as shown in Fig. 3. This float is attached to and is adjustable on the bait-line $g$ in the usual or any desired manner.

Our improvement may be applied to one end of the float or to both ends.

Any known style or form of coupling other than the screw may be used. If a screw is employed, it may be made of wood, hard rubber, or metal.

Having described our invention, we claim—

1. A float for fishing-lines, having a cavity and provided at its end with a reversible stem coupled to the float, whereby when the float is in use on a bait-line the stem may be attached and when not in use the stem may be inserted in the cavity.

2. The combination of a float-body having a cavity provided with a female screw, $c$, and a stem having a collar, $e$, and two screw-couplings, one each side of said collar, for the purpose set forth.

In testimony whereof we affix our signatures in the presence of two witnesses.

EDW. J. HAYES.
JNO. T. OCHS.

Witnesses:
JOHN E. MORRIS,
JNO. T. MADDOX.